US011708217B2

United States Patent
Liu et al.

(10) Patent No.: US 11,708,217 B2
(45) Date of Patent: *Jul. 25, 2023

(54) RELAY-TYPE GOODS PICKING SYSTEM AND METHOD

(71) Applicant: BEIJING GEEKPLUS TECHNOLOGY CO., LTD., Beijing (CN)

(72) Inventors: Kai Liu, Beijing (CN); Hongbo Li, Beijing (CN)

(73) Assignee: BEIJING GEEKPLUS TECHNOLOGY CO., LTD., Beijing (CN)

( * ) Notice: Subject to any disclaimer, the term of this patent is extended or adjusted under 35 U.S.C. 154(b) by 81 days.

This patent is subject to a terminal disclaimer.

(21) Appl. No.: 17/304,837

(22) Filed: Jun. 25, 2021

(65) Prior Publication Data

US 2021/0316944 A1 Oct. 14, 2021

Related U.S. Application Data

(63) Continuation of application No. 16/495,076, filed as application No. PCT/CN2017/091443 on Jul. 3, 2017, now Pat. No. 11,072,495.

(51) Int. Cl.
*B65G 1/04* (2006.01)
*B25J 9/16* (2006.01)
*B65G 1/137* (2006.01)

(52) U.S. Cl.
CPC .......... *B65G 1/0485* (2013.01); *B25J 9/162* (2013.01); *B65G 1/1371* (2013.01);
(Continued)

(58) Field of Classification Search
CPC .... B65G 1/0485; B65G 1/1378; B65G 1/137; B65G 1/1373; G06Q 10/087; B25J 9/162
See application file for complete search history.

(56) References Cited

U.S. PATENT DOCUMENTS

| 9,067,317 B1 | 6/2015 | Wurman et al. |
| 9,248,965 B1 | 2/2016 | Kritchevsky |

(Continued)

FOREIGN PATENT DOCUMENTS

| CN | 104991556 A | 10/2015 |
| CN | 105858045 A | 8/2016 |

(Continued)

OTHER PUBLICATIONS

International Search Report for PCT/CN2017/091443 dated Oct. 26, 2017 with English Translation.

(Continued)

*Primary Examiner* — Timothy R Waggoner
(74) *Attorney, Agent, or Firm* — ArentFox Schiff LLP

(57) ABSTRACT

Provided is a relay goods picking system, the system includes: a plurality of carrying robots, a manual picking area, auxiliary pickup tools for manual goods picking which store goods for manual picking, a robot picking inventory container area provided with a plurality of inventory containers used for storing goods and being carried by the plurality of carrying robots, operating positions and a control system capable of communicating with the plurality of carrying robots and manual picking persons. For a mixed order which involves both goods in the manual picking area and goods in the robot picking rack area, under control of the control system, a person-to-goods picking mode and a goods-to-person picking mode are used to complete the goods picking.

17 Claims, 3 Drawing Sheets

(52) U.S. Cl.
CPC ........ *B65G 1/1378* (2013.01); *B65G 2201/02* (2013.01); *B65G 2203/0216* (2013.01); *B65G 2203/0241* (2013.01); *B65G 2209/02* (2013.01)

(56) References Cited

U.S. PATENT DOCUMENTS

| | | | |
|---|---|---|---|
| 11,072,495 B2* | 7/2021 | Liu | .......................... B25J 9/162 |
| 2016/0145045 A1 | 5/2016 | Mountz et al. | |
| 2018/0096299 A1* | 4/2018 | Jarvis | ................... G05D 1/0285 |
| 2020/0095063 A1 | 3/2020 | Liu et al. | |

FOREIGN PATENT DOCUMENTS

| | | |
|---|---|---|
| CN | 106311615 A | 1/2017 |
| CN | 106843238 A | 6/2017 |
| CN | 106956883 A | 7/2017 |
| JP | 2002338015 A | 11/2002 |
| JP | 2004231370 A | 8/2004 |
| JP | 2009096637 A | 5/2009 |
| JP | 2015535787 A | 12/2015 |
| JP | 2016113291 A | 6/2016 |
| JP | 2017007867 A | 1/2017 |
| JP | 2019532883 A | 11/2019 |
| WO | 2015125287 A1 | 8/2015 |
| WO | 2015052830 A1 | 3/2017 |
| WO | 2017100287 A1 | 6/2017 |

OTHER PUBLICATIONS

Extended European Search Report received for corresponding EP Application No. 17916581.6 dated Feb. 5, 2021.

\* cited by examiner

RELAY-TYPE GOODS PICKING SYSTEM AND METHOD

CROSS REFERENCE TO RELATED APPLICATIONS

This application is a continuation of U.S. Non-Provisional patent application Ser. No. 16/495,076, entitled "RELAY-TYPE GOODS PICKING SYSTEM AND METHOD" and filed on Sep. 17, 2021, which claims priority to International Patent Application No. PCT/CN2017/091443 entitled "RELAY-TYPE GOODS PICKING SYSTEM AND METHOD" and filed on Jul. 3, 2017, the disclosures of which are incorporated herein by reference in their entirety.

TECHNICAL FIELD

The present disclosure generally relates to logistics and warehousing technologies and in particular, relates to a relay-type goods picking method and a relay-type goods picking system in the field of e-commerce, a computing device and a computer-readable storage medium.

BACKGROUND

The rapid development of e-commerce and online shopping has brought an opportunity for the logistics and warehousing industry to rise rapidly and an unprecedented challenge to the logistics and warehousing industry. Manual picking refers to that a picker completes a picking operation with a picking task list (which may be papers, IPADs, voices, VR media etc.). The manual picking is a picking manner with lowest costs in the logistics and warehousing industry. The advantage of this manner is low hardware costs in a warehousing operating center, and the number of pickers can be increased when picking tasks are increased to improve a system shipping capacity. A biggest disadvantage of this manner is that information on types and numbers of items at goods positions in a warehousing system is unsynchronized with information on types and numbers of items in actual goods positions. To further improve picking efficiency, reduce time from an order for goods to delivering the goods and reduce a labor burden, a goods-to-person mode which uses an automatic robot picking system is an effective mode. The goods-to-person mode is based on an intelligent carrying robot. The robot automatically drives to a position directly below a target rack, lifts the target rack and sends the target rack to a sorting position according to order demands and inventory information. The picking position is equipped with a display device such as a display screen. The display device prompts position information of goods required in a delivery order. According to the prompt, a sorting person gets the required goods from the target rack and puts the required goods into a specified container to complete a sorting task. After the sorting task is finished, the robot sends the target rack back to a specified position. The above goods-to-person mode does not require personnel to move around in the whole process, thereby greatly improving the sorting efficiency and reducing labor intensity.

A manual picking mode and a robot-based goods-to-person picking mode both have advantages and disadvantages. How to combine the two picking modes and give full play to the advantages of the two picking modes to improve picking efficiency of an overall solution is a major issue to be solved urgently.

SUMMARY

The present disclosure is proposed in view of the above circumstances.

According to an aspect of the present disclosure, a relay-type goods picking system is provided. The system includes a plurality of carrying robots capable of lifting and transporting racks; a manual picking rack area, configured to store goods for manual picking; auxiliary pickup tools for manual goods picking, which accommodate containers and are convenient for manual driving or transportation, where a back-end system is operable to bind each auxiliary pickup tool for manual goods picking with a container accommodated by the each auxiliary pickup tool for manual goods picking and corresponding order information; a robot picking rack area provided with a plurality of racks and used for storing goods and being carried by the plurality of carrying robots, where in the robot picking rack area, the plurality of racks are arranged in a rack array with a plurality of rows and a plurality of columns, and empty rows/columns constitute channels for the plurality of carrying robots to pass; an operating position to which one of the plurality of carrying robots carries a rack of the plurality of racks and at which goods are picked from or restocked onto the rack by a picker; and a control system capable of communicating with the plurality of carrying robots and persons for manual picking and controlling order allocation, rack carrying and goods picking. Under control of the control system, a person-to-goods picking mode and a goods-to-person picking mode are used in series to complete the goods picking for a mixed order in a relay manner, where the mixed order involves both goods in the manual picking rack area and goods in the robot picking rack area, where the person-to-goods picking mode is used to complete picking for the goods in the manual picking rack area and the goods-to-person picking mode is used to complete picking for the goods in the robot picking rack area.

According to another aspect of the present disclosure, provided is a relay-type goods picking method executed by the relay-type goods picking system described above. The method includes: under control of the control system, a person-to-goods picking mode and a goods-to-person picking mode are used in series to complete the goods picking for a mixed order in a relay manner, where the mixed order involves both goods in the manual picking rack area and goods in the robot picking rack area, where the person-to-goods picking mode is used to complete picking for the goods in the manual picking rack area and the goods-to-person picking mode is used to complete picking for the goods in the robot picking rack area.

With the relay-type goods picking system and the relay-type goods picking method according to embodiments of the present disclosure, driven by data in whole, the goods picking is performed in the relay manner (manual picking and then robot-based goods-to-person picking, or the robot-based goods-to-person picking and then the manual picking), which combines the advantages of the manual picking and the robot-based goods-to-person picking and improves the picking efficiency of the overall solution.

BRIEF DESCRIPTION OF DRAWINGS

These and/or other aspects and advantages of the present disclosure will become more apparent and easily understood from the following detailed description of embodiments of the present disclosure in connection with the drawings. In the drawing.

DETAILED DESCRIPTION

For a better understanding of the present disclosure by those skilled in the art, the present disclosure will be described in further detail below in conjunction with the drawings and specific embodiments.

According to an embodiment of the present disclosure, provided is a relay-type goods picking system. The system includes a plurality of carrying robots, a manual picking rack area, auxiliary pickup tools for manual goods picking, a robot picking rack area, an operating position and a control system. The carrying robots are capable of lifting and transporting racks. The manual picking rack area is provided with a plurality of manual picking racks which stores goods for manual picking, each manual picking rack has a unique number, and information on positions of the manual picking racks and information on identifiers and quantities of goods at the positions are stored in the control system. The auxiliary pickup tools for manual goods picking accommodate containers and are convenient for manual driving or transportation. A back-end system is operable to bind each auxiliary pickup tool for manual goods picking with a container accommodated by the each auxiliary pickup tool for manual goods picking and corresponding order information. The robot picking rack area is provided with a plurality of racks used for storing goods and being carried by the carrying robots. In the robot picking rack area, the plurality of racks are arranged in a rack array with a plurality of rows and a plurality of columns, and empty rows/columns constitute channels for the carrying robots to pass. The carrying robot carries the racks to the operating position where goods are picked from or restocked onto the rack by a picker. The control system is configured to classify orders into a manual picking order, a goods-to-person picking order and a mixed order. The manual picking order only involves the goods in the manual picking rack area, the goods-to-person picking order merely involves the goods in the robot picking rack area, and the mixed order involves both the goods in the manual picking rack area and the goods in the robot picking rack area. For the mixed order, under control of the control system, a person-to-goods picking mode and a goods-to-person picking mode are used in series to complete the goods picking for a mixed order in a relay manner, where the person-to-goods picking mode is used to complete picking for the goods in the manual picking rack area and the goods-to-person picking mode is used to complete picking for the goods in the robot picking rack area.

Figure 1:
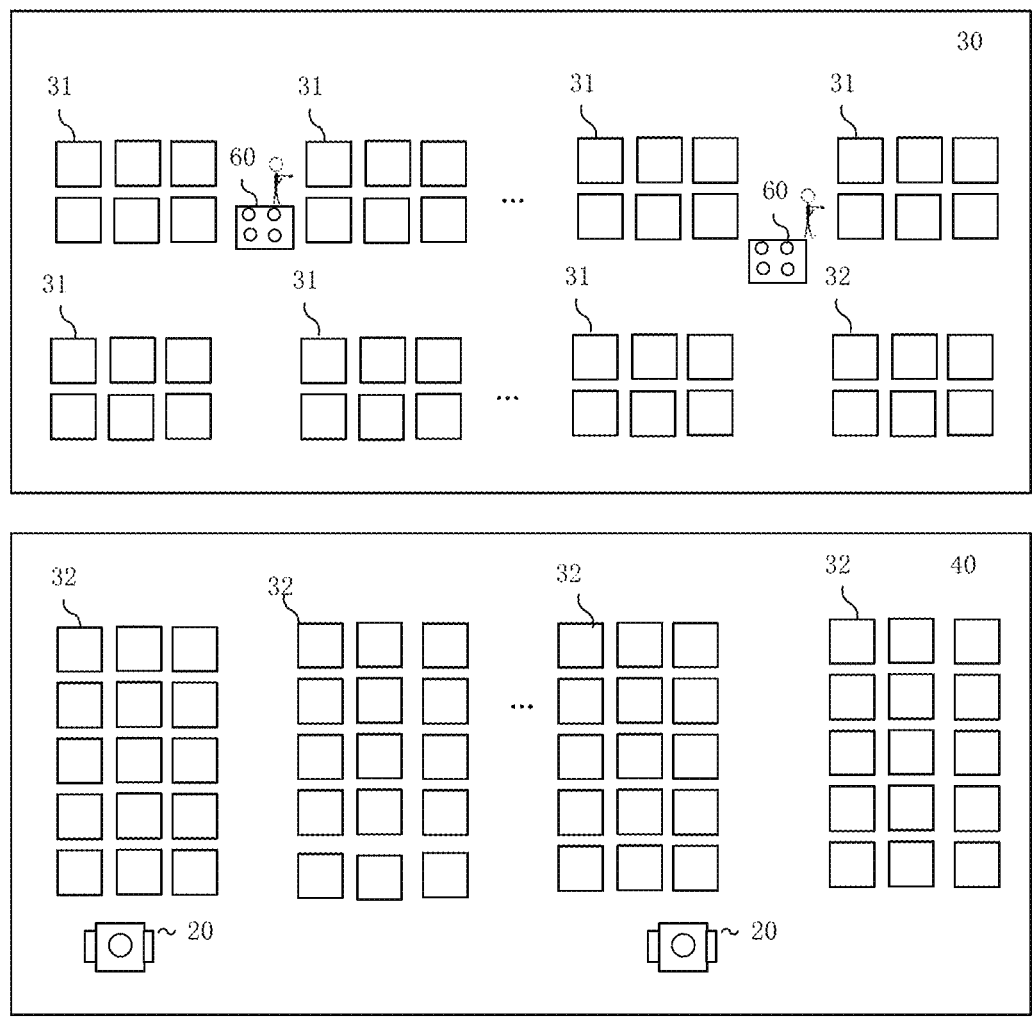
FIG. 1 illustrates a goods picking system 100 according to an embodiment of the present disclosure.
Figure 1:
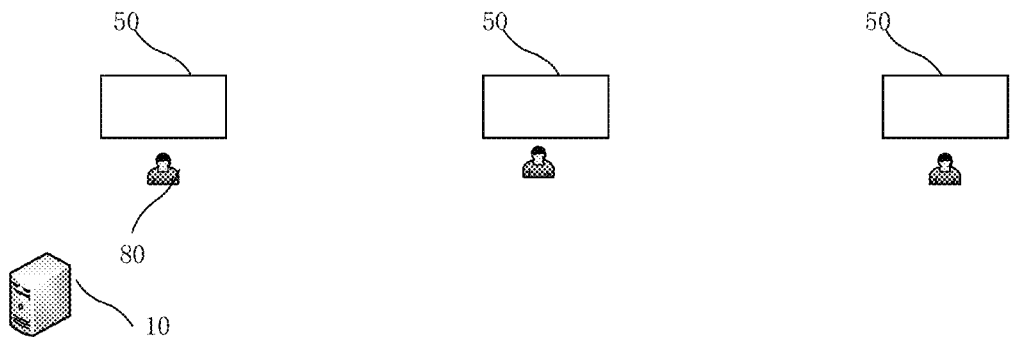

FIG. 1 illustrates a goods picking system 100 according to an embodiment of the present disclosure. The goods picking system 100 includes a control system 10, carrying robots 20, operating positions 50, a manual picking rack area 30, a robot picking rack area 40 and auxiliary pickup tools for manual goods picking 60.

The manual picking rack area 30 is configured to store the goods for the manual picking. In one example, popular merchandise (merchandise frequently placed in orders) in a sales season or a promotion period is stored in the manual picking rack area 30. If the popular merchandise is placed in the robot picking rack area and picked in the goods-to-person mode, the following operations need to be frequently performed: carrying racks to the operating position, picking goods and carrying the racks back to the rack area. For the popular merchandise, a manual picking mode is adopted without carrying racks and can pick various kinds of popular merchandise for multiple orders at one time, which has higher efficiency than the goods-to-person picking mode.

The robot picking rack area 40 is provided with the plurality of racks used for storing goods and being carried by the carrying robots 20. In the robot picking rack area, the racks are arranged in the rack array with the plurality of rows and the plurality of columns, and the empty rows/columns constitute the channels for the carrying robots to pass.

In an example shown in FIG. 1, the manual picking rack area 30 is provided with the plurality of manual picking racks which stores the goods for manual picking, each manual picking rack has a unique number, and information on the positions of the manual picking racks and information on the identifiers and quantities of the goods at the positions are stored in the control system.

The auxiliary pickup tools for manual goods picking 60 accommodate the containers and are convenient for manual driving or transportation. The back-end system (e.g. the control system) is operable to bind each auxiliary pickup tool for manual goods picking with a container accommodated by the each auxiliary pickup tool for manual goods picking and the corresponding order information. For example, when orders are allocated, the orders are bound with the container; when the container is placed in the auxiliary pickup tools for manual goods picking, the container is bound with the auxiliary pickup tools for manual goods picking; in this way, each auxiliary pickup tool for manual goods picking is bound with the accommodated containers and the corresponding order information. Therefore, a back-end operating system can plan optimal traveling and picking paths for picking persons according to the bound information and information on positions in the manual picking rack area and corresponding goods. Hereinafter, the containers are sometimes referred to as bins.

Figure 2:
FIG. 2 illustrates a pickup cart as an example of an auxiliary pickup tool for manual goods picking.

Examples of the auxiliary pickup tools for manual goods picking 60 include a pickup cart, a pallet truck with trays, a table trolley and the like. FIG. 2 illustrates a pickup cart as an example of an auxiliary pickup tool for manual goods picking.

In one example, the auxiliary pickup tools for manual goods picking are attached with a picking order indication tool for indicating how to pick goods for manual picking in the order. In one example, the picking order indication tool may be a paper picking order or a paperless picking order (such as RF, an IPad and a mobile phone).

Preferably, when the picking person performs picking in the manual picking rack area with the auxiliary pickup tools for manual goods picking, information on associated racks, positions of the associated rack and goods at the positions is updated in real time as the picking is performed, for example, picking completion information of goods on the paperless picking order is manually triggered. For example, if the paperless picking order indicates that one of a certain book is picked from a certain position of a certain rack, input information in a voice or touch manner after completion to indicate that the picking is finished, and thus the system updates the states (such as quantities) of the goods at positions of related racks.

The carrying robots 20 move in the robot picking rack area, an area between the robot picking rack area and the operating positions and in other areas. The carrying robots 20 can lift and transport the racks 32 and perform goods picking tasks under the control of the control system 10. For example, the carrying robots 20 may drive in an empty space 60 (part of the channels for the carrying robots to pass) in the rack array to below a target rack 30, lift the target rack 32 and carry the target rack 30 to an assigned operating position 50. Preferably, each carrying robot has a lifting mechanism, a camera and a communication component, and has an autonomous navigation function. The carrying robots communicate with a control system via the communication component, and may even communicate with other carrying robots. The carrying robots can know their positions and move forward according to two-dimensional codes on the ground taken by the cameras, can drive to below the racks and lift the racks with the lifting mechanisms.

In one example, each rack 32 is a cuboid frame with a plurality of layers for placing goods. The racks are carried by the carrying robots 20 and pickers pick goods from the racks. A bottom of each rack has four symmetrical rack legs whose heights are larger than a height of each carrying robot. The carrying robots are allowed to pass through the bottom of the racks. Each layer of the racks also has a corresponding tag for identification. In one example, the bottom of each rack has a two-dimensional code for the carrying robots to identify, and the two-dimensional code of each rack has uniqueness. As many types of goods are placed on each rack as possible to enable each rack to cover as many orders as possible and reduce times of carrying the racks.

The operating positions 50 are places for pickers to perform picking operations in a goods-to-person picking case. The carrying robots 20 carry the racks 32 to the operating positions 50 for pickers 80 (picking persons or robots) to pick goods from the racks 32 or restock goods onto the racks 32.

The control system 10 is configured to classify orders into the manual picking order, the goods-to-person picking order and the mixed order. The manual picking order merely involves the goods in the manual picking rack area, the goods-to-person picking order merely involves the goods in the robot picking rack area, and the mixed order involves both the goods in the manual picking rack area and the goods in the robot picking rack area. For the mixed order, under the control of the control system, the person-to-goods picking mode and the goods-to-person picking mode are used in series to complete the goods picking for the mixed order in the relay manner, where the person-to-goods picking mode is used to complete picking for the goods in the manual picking rack area and the goods-to-person picking mode is used to complete picking for the goods in the robot picking rack area.

Specifically, goods involved in each order belong to their respective categories. The goods are either placed in the manual picking rack area or placed in the robot picking rack area. The control system classifies the orders based on the categories of all the goods involved in each order. In condition that all the goods involved in the order are placed in the manual picking rack area, the order is classified as the manual picking order. In condition that the order merely involves the goods in the robot picking rack area, the order is classified as the goods-to-person picking order. In condition that the order involves both the goods in the manual picking rack area and the goods in robot picking rack area, the order is classified as the mixed order.

In one example, the control system does not perform an explicit order classification operation; instead, the control system links an order to be processed with a certain container and a certain auxiliary pickup tool for manual goods picking. Regardless of the type of the orders, corresponding containers are placed on one auxiliary pickup tool for manual goods picking and the one auxiliary pickup tool for manual goods picking is transported to the manual picking rack area. In the manual picking rack area, one picking person performs goods picking for related orders according to printed paper orders or orders indicated by an electronic tool, that is, the one picking person performs goods picking for the orders (containers) which involve the goods in the manual picking rack area and puts aside the orders (containers) that do not involve the goods in the manual picking rack area. Preferably, after all the containers (orders) which involve the goods in the manual picking rack area on the one auxiliary pickup tool for manual goods picking are processed, the one auxiliary pickup tool for manual goods picking is transported to one operating position to perform goods picking for orders which involve the goods in the robot picking rack area. However, in some cases, for a certain auxiliary pickup tool for manual goods picking, it is unnecessary to complete manual picking merely one time for the orders which involve the goods in the manual picking rack area; the manual picking and robot picking may be performed alternately.

The control system 10 may be a computing platform composed of components such as a processor, a memory, software and a network. The control system 10 may provide an electronic shopping service for an e-commerce individual user. The control system 10 may include one or more servers, and may be a centralized control architecture or a distributed computing architecture. The server may have a processor and a memory which may include an order pool therein.

The control system also stores logo information of the robots and the system, order information and information about operation processes.

The control system 10 is operable to communicate with the carrying robots 20, auxiliary display devices at the operating positions and the pickers in a communication manner such as a wireless communication technology or a wired communication technology. The control system 10 is also operable to communicate with the outside via a network.

Users may use client terminals to be connected to the control system 10 via the network and the users make orders through shopping user interfaces of electronic shopping applications (APPs). Based on the orders, the control system 10 determines the racks to be carried, the carrying robots responsible for the carrying, the operating positions to which the racks are carried and carrying routes of the carrying robots, delivers carrying instructions to the carrying robots, and instructs the pickers at the operating positions to perform picking operations.

The operating positions 50 are places for goods picking in the goods-to-person picking mode. The carrying robots 20 carry the racks 32 to the operating position 50 where goods are picked from or restocked onto the rack 32 by a picker 80.

Generally, the operating positions 50 are disposed around the rack area.

Figure 3:
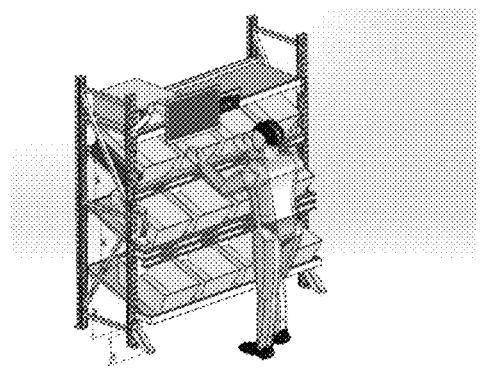
FIG. 3 is a schematic diagram of a seeding wall.

Preferably, a seeding wall is disposed at the operating position 50, the container is placed at a position for placing goods on the seeding wall, and each container corresponds to an order. In the goods-to-person picking mode, the carrying robots carry racks to the operating positions and the picking persons pick goods from the racks and place the goods into corresponding containers on the seeding walls. When the goods picking is finished for a corresponding order, a corresponding container is taken away for packaging and then a new container is placed to perform the goods picking for a new order. FIG. 3 is a schematic diagram of a seeding wall. The seeding wall is provided with a display device installed thereon. The display device displays information to indicate that information on merchandise to be picked and information on positions of the merchandise on the racks and other information are displayed on a display screen. According to the display information of an LCD screen, the picking person picks corresponding merchandise from the racks and scan the picked merchandise with a code scanning gun. In condition that a scanning result is consistent with barcodes and other information of the merchandise to be picked, the picking person places the merchandise into a specified container on the seeding wall according to a screen, an indicator light and other prompts and continues to perform a next task until the picking task is finished. In condition that the information is inconsistent, the screen gives a merchandise error prompt to require the picking person to perform the picking task again.

Preferably, a picking frequency of the goods in the manual picking rack area is higher than a picking frequency of the goods in the robot picking rack area.

Based on the above relay-type goods picking system, provided is a relay-type goods picking method which combines the person-to-goods manual picking and the goods-to-person picking based on robots. The person-to-goods manual picking and the goods-to-person picking based on robots are performed in any sequence, that is, the person-to-goods manual picking may be performed before the goods-to-person picking based on robots, or the goods-to-person picking based on robots is performed before the person-to-goods manual picking, or the person-to-goods manual picking and the goods-to-person picking based on robots are performed alternately.

Based on the above system, in a relay stage between the person-to-goods manual picking and the goods-to-person picking based on robots, a changed container mode (also referred to as a changed bin mode) may be adopted, an unchanged container mode (an unchanged bin mode) may also be adopted which means to employ the same auxiliary pickup tool for manual goods picking with accommodated containers, or the two modes are combined, or other forms may be adopted.

Figure 4:
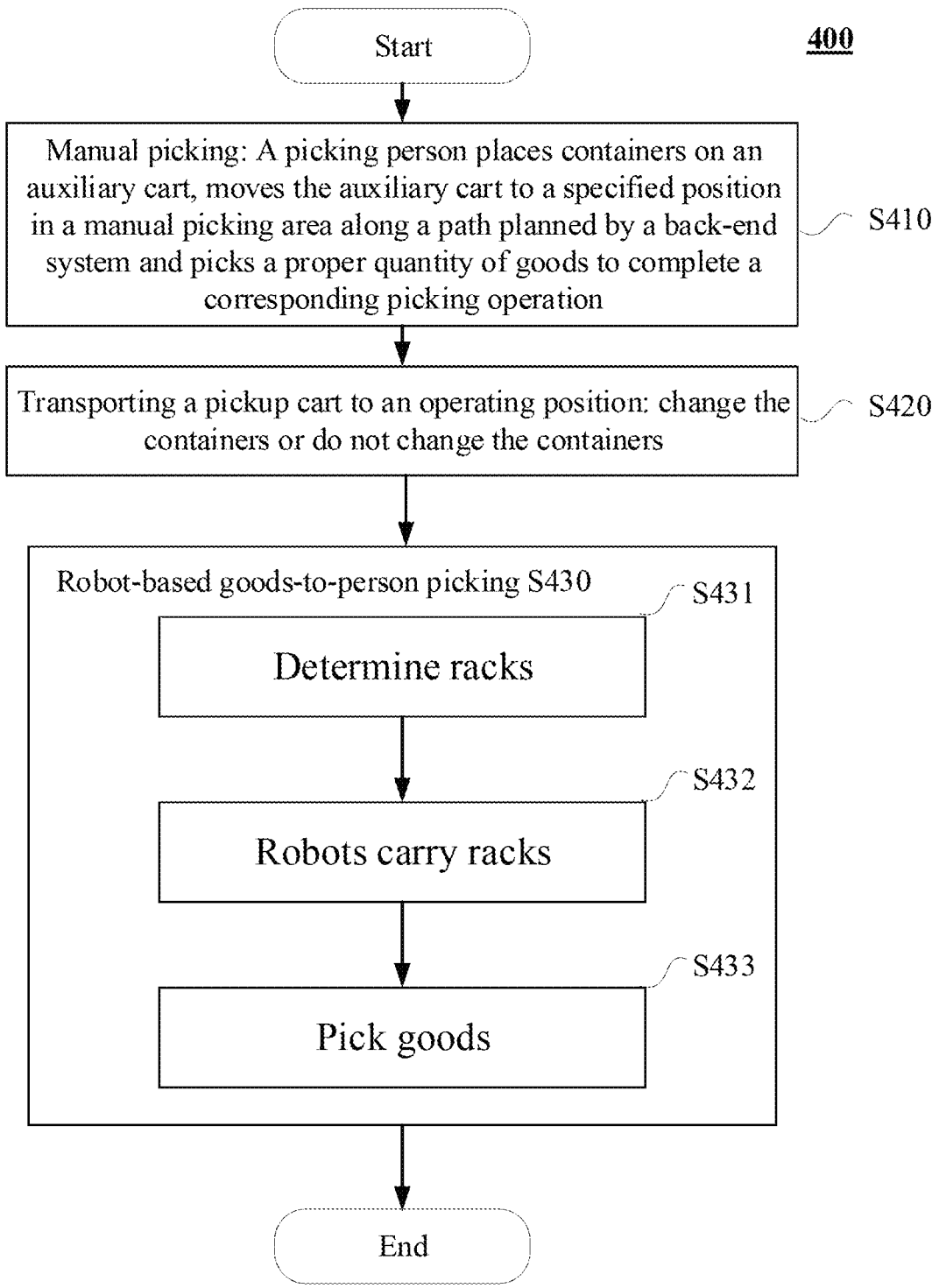
FIG. 4 illustrates an overall flowchart of a relay-type goods picking method 400 in which person-to-goods picking is performed before goods-to-person picking according to an embodiment of the present disclosure.

FIG. 4 illustrates an overall flowchart of a relay-type goods picking method 400 in which person-to-goods picking is performed before goods-to-person picking according to an embodiment of the present disclosure.

As shown in FIG. 4, in step S410, manual picking is performed.

Specifically, containers are placed on an auxiliary pickup cart and bound with order information. The picking person moves the auxiliary pickup cart to each specified position in the manual picking rack area along a path planned by the control system, picks corresponding goods, and places the goods into corresponding containers.

Preferably, the pickup cart merely accommodates containers corresponding to orders which involve the goods in the manual picking rack area and does not accommodate containers corresponding to orders which merely involve the goods in a goods-to-person rack area.

However, as needed, containers corresponding to orders to be processed in a period are all placed in the pickup cart without distinguishing the types of the goods in the orders, that is, no matter whether the goods involved in the orders are goods in the manual picking rack area, the corresponding containers are all placed on the pickup cart. In this case, during the manual picking, the picking person performs goods picking according to instructions such as paper order information or electronic order information.

In step S420, after the manual picking, the pickup cart is transported to an operating position, and the bins are changed or unchanged according to the subsequent operation mode.

In the changed container mode, when the person-to-goods picking and the goods-to-person picking are switched, the containers in the pickup cart are unloaded and placed on the seeding wall. The picking person scans container barcodes or picking orders to enable the back-end system to establish corresponding information of picking positions (e.g. operating positions) on the seeding wall, containers and order information, so as to prepare for the subsequent goods-to-person picking.

In the unchanged container mode, when the person-to-goods picking and the goods-to-person picking are switched, the containers are still placed in the pickup cart without changing their positions, and the pickup cart is taken as the seeding wall to perform the picking operation. The whole relay-type picking system adopts the same auxiliary pickup tool for goods picking with accommodated containers (such as the pickup cart, the pallet truck with trays and the table trolley) in a robot-based goods-to-person rack area and a person-to-goods manual picking rack area and the containers are unchanged to minimize the workload in the relay stage and improve the relay-type picking efficiency.

By scanning barcodes and the like, the mixed order, the auxiliary pickup tool for goods picking, positions of the auxiliary pickup tool for goods picking, containers and sub-orders obtained by splitting the mixed order (a person-to-goods picking sub-order and a goods-to-person picking order obtained by splitting the mixed order) are bound to established one or more correspondences. After the correspondences are established, the picking person may scan any barcode of the mixed order, the auxiliary pickup tool for goods picking, the positions of the auxiliary pickup tool for goods picking, the containers and the sub-orders to enable the back-end system to acquire the one or more correspondences of the above mixed order, pickup tool, positions of the pickup tool, containers and sub-orders.

Next, in step S430, the robot-based goods-to-person picking is performed.

Specifically, the robot-based goods-to-person picking may be performed in the following operations:

In step S431, racks are determined.

Specifically, the control system determines one or more target racks to be carried according to business requirements, inventory information, and rack selection strategies.

In step S433, the carrying robots carry the racks.

Specifically, the control system specifies a certain robot to carry the rack to a specified operating position according to a robot scheduling strategy.

In step S433, the goods picking is performed.

Specifically, after the carrying robot carries the racks to the operating position, multiple carrying robots queue at the operating position according to the scheduling strategy. The operating position is provided with the display screen and information on merchandise to be picked and information on positions of the merchandise on the racks and other information are all displayed on the display screen. According to the display information of the LCD screen, the picking person picks corresponding merchandise from the racks and scan the picked merchandise with the code scanning gun. In condition that the scanning result is consistent with barcodes and other information of the merchandise to be picked, the picking person places the merchandise into specified containers according to the screen, the indicator light and other prompts and continues to perform a next task until the picking task is finished. In condition that the information is inconsistent, the screen gives the merchandise error prompt to require the picking person to perform the picking task again.

In this way, the relay picking is completed by performing the person-to-goods picking mode before the goods-to-person picking mode.

Alternatively, the relay picking may be implemented by performing the goods-to-person picking mode before the person-to-goods picking mode.

In one example, in a robot-based goods-to-person picking system, the screen at the picking position (e.g. the operating position) may be replaced with VR glasses or voice prompts.

In one example, in the manual picking step, in addition to the above fruit picking manner, a combination of fruit picking and seeding may also be adopted. That is, an operator first collects goods in the fruit picking manner in the manual picking rack area according to statistical information of the goods to be picked and then places the collected goods into containers corresponding to the orders in the seeding manner.

In one example, in the good-to-person picking step, in addition to the above direct picking manner, a layered picking mode may also be adopted. Specific reference may be made to a Chinese patent application (No. 201610825164.7 entitled layered goods picking method and system and calculating device) earlier filed by Shanghai Jiluo Intelligent Technology Co., Ltd.

In one example, every time goods on racks in the manual picking rack area are manually picked, information on positions of manual picking racks and information on identifiers and quantities of goods at the positions stored in the control system are updated. Such an update may be manually completed by the picking persons. For example, related information may be inputted on a handheld electronic device. Alternatively, the update may be automatically or semi-automatically implemented by means of corresponding monitoring functions, for example, automatically implemented by video surveillance, image processing. In the process, an automatic speech recognition technology may be combined or a manual error correction operation may also be combined.

It should be noted that in the foregoing description, in the person-to-goods picking mode, the auxiliary pickup tools for manual goods picking with accommodated containers are transported manually to the manual picking rack area for goods picking. Alternatively, the automated transporting tools carrying containers may be automatically transported to the manual picking rack area for the picking persons waiting here to perform the manual picking. Specifically, after the auxiliary pickup tools for manual goods picking or reach the manual picking rack area, the goods picking is performed manually, for example, in an order picking sequence instructed by the control system.

In one example, to update in time the states of the orders in the system for drive the correct execution of subsequent tasks, for two stages of the relay manner, after the goods picking at any stage is completed, a picking state of a corresponding order maintained in the control system is updated.

In summary, the present disclosure provides at least the following technical solutions:

1. A relay-type goods picking system, including:
a plurality of carrying robots capable of lifting and transporting racks;
a manual picking rack area, which is configured to store goods for manual picking;
auxiliary pickup tools for manual goods picking, which accommodate containers and are convenient for manual driving or transportation, where a back-end system is operable to bind each auxiliary pickup tool for manual goods picking with a container accommodated by the each auxiliary pickup tool for manual goods picking and collecting and corresponding order information;
a robot picking rack area provided with a plurality of racks used for storing goods and being carried by the plurality of carrying robots, where in the robot picking rack area, the plurality of racks are arranged in a rack array with a plurality of rows and a plurality of columns, and empty rows/columns constitute channels for the plurality of carrying robots to pass;
operating positions to which the plurality of carrying robots carry the plurality of racks and at which a picker picks goods from the plurality of racks or restock goods onto the plurality of racks; and
a control system capable of communicating with the plurality of carrying robots and a manual picking person and controlling order allocation, rack carrying and goods picking;
where for a mixed order which involves both goods in the manual picking rack area and goods in the robot picking rack area, under control of the control system, a person-to-goods picking mode and a goods-to-person picking mode are used in series to complete the goods picking for the mixed order in a relay manner, where the person-to-goods picking mode is used to complete picking for the goods in the manual picking rack area and the goods-to-person picking mode is used to complete picking for the goods in the robot picking rack area.

2. The relay-type goods picking system according to 1, where the control system is configured to classify orders into a manual picking order, a goods-to-person picking order and the mixed order, where the manual picking order merely involves the goods in the manual picking rack area and the goods-to-person picking order merely involves the goods in the robot picking rack area;
for the manual picking order, the control system controls the goods picking in the person-to-goods picking mode; and
for the goods-to-person picking order, the control system controls the goods picking in the goods-to-person picking mode.

3. The relay-type goods picking system according to 1, where the manual picking rack area is provided with a plurality of manual picking racks which stores the goods for manual picking, each of the plurality of manual picking racks has a unique number, and information on positions of the plurality of manual picking racks and information on identifiers and quantities of goods at the positions are stored in the control system.

4. The relay-type goods picking system according to 1, where a picking frequency of the goods in the manual picking rack area is higher than a picking frequency of the goods in the robot picking rack area.

5. The relay-type goods picking system according to 1, where completing the goods picking in the relay manner for the mixed order includes:
first completing picking for the goods in the manual picking rack area in the person-to-goods picking mode and then completing picking for the goods in the robot picking rack area in the goods-to-person picking mode.

6. The relay-type goods picking system according to 5, where for a same mixed order, a same container is used for the goods picking in the person-to-goods picking mode and the goods picking in the goods-to-person picking mode, and the same container is always placed on a same auxiliary pickup tool for manual goods picking.

7. The relay-type goods picking system according to 5, further including a seeding wall placed at the operating position, wherein for a same mixed order, a same container is used for the goods picking in the person-to-goods picking mode and the goods picking in the goods-to-person picking mode, and the same container is placed on one of the auxiliary pickup tools for manual goods picking and collecting in the person-to-goods picking mode and is placed on the seeding wall in the goods-to-person picking mode; wherein a position of the seeding wall is rebound with a container identifier and order information after the same container is placed on the seeding wall.

8. The relay-type goods picking system according to 1, where completing the goods picking for the mixed order comprises:

first completing picking for the goods in the robot picking rack area in the goods-to-person picking mode and then completing picking for the goods in the manual picking rack area in the person-to-goods picking mode.

9. The relay-type goods picking system according to any one of 1 to 8, when goods on racks in the manual picking rack area are manually picked, information on positions of manual picking racks and information on identifiers and quantities of goods at the positions stored in the control system are updated.

10. The relay-type goods picking system according to any one of 1 to 8, where the each auxiliary for manual goods picking and collecting is bound with the container accommodated by the each auxiliary for manual goods picking and collecting and the corresponding order information by scanning a barcode of a cart and/or a barcode of the container with a scanner.

11. The relay-type goods picking system according to any one of 1 to 8, where in the person-to-goods picking mode, one of the auxiliary pickup tools for manual goods picking with an accommodated container is transported manually to the manual picking rack area for the goods picking; and in the goods-to-person picking mode, the picker and container are at a picking position (e.g. an operating position), one of the plurality of carrying robots carries one of the plurality of racks to the operating position, and goods are picked from the one of the plurality of racks to the container by the picker.

12. The relay-type goods picking system according to 11, where in the person-to-goods picking mode, the one of the auxiliary pickup tools for manual goods picking is transported manually along a route planned by the control system to the manual picking rack area for the goods picking.

13. The relay-type goods picking system according to 12, where after the one of the auxiliary pickup tools for manual goods picking arrives at the manual picking rack area, the goods picking is performed manually in an order picking sequence instructed by the control system.

14. The relay-type goods picking system according to any one of 1 to 8, where for two stages of the relay manner, a picking state of a corresponding order maintained in the control system is updated after the goods picking at any stage is completed.

15. The relay-type goods picking system according to any one of 1 to 8, where under the control of the control system, the person-to-goods picking mode and the goods-to-person picking mode are used in series to complete the goods picking for mixed order in the relay manner by that:

in condition that the person-to-goods picking mode is performed before the goods-to-person picking mode, (1) after the goods picking in the person-to-goods picking mode is completed, one of the auxiliary pickup tools for manual goods picking which accommodates a container associated with the mixed order is transported to an operating position at which tool identifier information, container identifier information and corresponding order information of the one of the auxiliary pickup tools for manual goods picking is associated and maintained in the control system, and the corresponding order information has been updated to indicate a picking task to be completed in the mixed order, where the picking task merely involves the goods in the robot picking rack area; (2) and then the goods picking is completed in the good-to-person picking mode, which includes rack allocation, the rack carrying, and picking goods from racks to a container on a seeding wall based on the order information; or in condition that the goods-to-person picking mode is performed before the person-to-goods picking mode, (1) at the operating position, the tool identifier information, the container identifier information and the corresponding order information of one of the auxiliary pickup tools for manual goods picking is associated and maintained in the control system, and the corresponding order information indicates a picking task associated with the goods-to-person picking mode to be completed in the mixed order and associated with the goods-to-person picking mode, where the picking task associated with the goods-to-person picking mode merely involves the goods in the robot picking rack area; (2) and then the goods picking is completed in the good-to-person picking mode, which includes the rack allocation, the rack carrying and the picking goods from the racks to the container on the seeding wall based on the order information; (3) after the goods picking in the goods-to-person picking mode is completed, the order information is updated to indicate a picking task associated with the person-to-goods picking mode to be completed in the mixed order and associated with the person-to-goods picking mode, where the picking task merely involves the goods in the manual picking rack area.

16. A relay-type goods picking method executed by the relay-type goods picking system, including:

for a mixed order which involves both goods in the manual picking rack area and goods in the robot picking rack area, completing, under control of the control system, goods picking for the mixed order in a relay manner by using a person-to-goods picking mode and a goods-to-person picking mode in series, where the person-to-goods picking mode is used to complete picking of the goods in the manual picking rack area and the goods-to-person picking mode is used to complete picking of the goods in the robot picking rack area.

17. The relay-type goods picking method according to 16, further including:

classifying, by the control system, orders to be processed into a manual picking order, a goods-to-person picking order and the mixed order, where the manual picking order merely involves the goods in the manual picking rack area, the goods-to-person picking order merely involves the goods in the robot picking rack area, and the mixed order involves both the goods in the manual picking rack area and the goods in the robot picking rack area; where for the manual picking order, the goods picking is performed in the person-to-goods picking mode under the control of the control system;

for the goods-to-person picking order, under the control of the control system, the goods picking is performed in the goods-to-person picking mode that is based on robots, wherein in the goods-to-person picking order, the control system determines a rack to be carried based on the goods-to-person picking order, instructs one of the robots to carry the rack from the robot picking rack area to an operating position at which goods are picked from the rack by the picker under the control of the control system; and for the mixed order, under the control of the control system, completing the person-to-goods picking mode and the goods-to-person picking mode are used in series to complete the goods picking in the relay manner.

18. The relay-type goods picking method according to 16, where the completing the goods picking for the mixed order in the relay manner includes:

first completing picking for the goods in the manual picking rack area in the person-to-goods picking mode and then completing picking for the goods in the robot picking rack area in the goods-to-person picking mode.

19. The relay-type goods picking method according to 18, where for a same mixed order, a same container is used for the goods picking in the person-to-goods picking mode and the goods picking in the goods-to-person picking mode, and the same container is always placed on a same auxiliary pickup tool for manual goods picking.

20. The relay-type goods picking method according to 18, where a seeding walls is placed at an operating positions, where for a same mixed order, a same container is used for the goods picking in the person-to-goods picking mode and the goods picking in the goods-to-person picking mode and the same container is placed on one of the auxiliary pickup tools for manual goods picking and collecting for the goods picking in the person-to-goods picking mode and is placed on one of the seeding walls for the goods picking in the goods-to-person picking mode; and after the same container is placed on the seeding wall, a position of the seeding wall is rebound with a container identifier and order information.

21. The relay-type goods picking method according to 17, where completing the goods picking for the mixed order includes:

first completing picking for the goods in the robot picking rack area in the goods-to-person picking mode and then completing picking for the goods in the manual picking rack area in the person-to-goods picking mode.

22. The relay-type goods picking method according to any one of 17 to 21, where when goods on racks in the manual picking rack area are manually picked, information on positions of the manual picking racks and information on identifiers and quantities of goods at the positions stored in the control system are updated.

23. The relay-type goods picking method according to any one of 17 to 21, where the each auxiliary pickup tools for manual goods picking is bound with the accommodated containers and the corresponding order information by scanning a barcode of a cart and/or a barcode of a container with a scanner.

24. The relay-type goods picking method according to any one of 17 to 21, where in the person-to-goods picking mode, the each auxiliary pickup tool for manual goods picking with the accommodated containers is transported manually to the manual picking rack area for the goods picking; and in the goods-to-person picking mode, the picker and a container are at a picking position (e.g. an operating position), one of the plurality of carrying robots carries one of the plurality of racks to the operating position, and goods are picked from the one of the plurality of racks to the container by the picker.

25. The relay-type goods picking method according to 24, where in the person-to-goods picking mode, the one of the auxiliary pickup tools for manual goods picking is transported manually along a route planned by the control system to the manual picking rack area for the goods picking.

26. The relay-type goods picking method according to 25, where after the one of the auxiliary pickup tools for manual goods picking arrives at the manual picking rack area, the goods picking is performed manually in an order picking sequence instructed by the control system.

27. The relay-type goods picking method according to any one of 17 to 21, where for two stages of the relay manner, after the goods picking at any stage is completed, a picking state of a corresponding order maintained in the control system is updated.

The above have described various embodiments of the present disclosure. The above description is illustrative, and not exhaustive, and not limited to the disclosed various embodiments. Without departing from the scope and spirit of the described various embodiments, various modifications and variations are apparent to those skilled in the art. Therefore, the protection scope of the present disclosure is subject to the protection scope of the claims.

What is claimed is:

1. A relay-type goods picking system, comprising:
   a plurality of carrying robots capable of lifting and transporting inventory containers;
   a manual picking area, which is configured to store goods for manual picking;
   auxiliary pickup tools for manual goods picking, which are configured to accommodate containers and are convenient for manual driving or transportation, wherein a back-end system is operable to bind each auxiliary pickup tool for manual goods picking with a container accommodated by the each auxiliary pickup tool for manual goods picking and corresponding order information;
   a robot picking inventory container area provided with a plurality of inventory containers used for storing goods and being carried by the plurality of carrying robots, an operating position to which one of the plurality of carrying robots carries a inventory container of the plurality of inventory containers and at which goods are picked from or restocked onto the inventory container by a picker; and
   a control system capable of communicating with the plurality of carrying robots and a manual picking person and controlling order allocation, inventory container carrying and goods picking;
   wherein for a mixed order which involves both goods in the manual picking area and goods in the robot picking inventory container area, under control of the control system, a person-to-goods picking mode and a goods-to-person picking mode are used complete the goods picking for the mixed order under control of the control system, wherein the person-to-goods picking mode is used to complete picking for the goods in the manual picking area and the goods-to-person picking mode is used to complete picking for the goods in the robot picking inventory container area;
   wherein completing the goods picking in the relay manner for the mixed order comprises:
   first completing picking for the goods in the manual picking area in the person-to-goods picking mode and then completing picking for the goods in the robot picking inventory container area in the goods-to-person picking mode; or
   first completing picking for the goods in the robot picking inventory container area in the goods-to-person picking mode and then completing picking for the goods in the manual picking area in the person-to-goods picking mode;

wherein the relay-type goods picking system further comprises: a seeding wall placed at the operating position, wherein for a same mixed order, a same container is used for the goods picking in the person-to-goods picking mode and the goods picking in the goods-to-person picking mode, and the same container is placed on one of the auxiliary pickup tools for manual goods picking in the person-to-goods picking mode and is placed on the seeding wall in the goods-to-person picking mode; and a position of the seeding wall is rebound with a container identifier and order information after the same container is placed on the seeding wall.

2. The relay-type goods picking system of claim 1, wherein the control system is configured to classify orders into a manual picking order, a goods-to-person picking order and the mixed order, wherein the manual picking order merely involves the goods in the manual picking area and the goods-to-person picking order merely involves the goods in the robot picking inventory container area;

for the manual picking order, the control system controls the goods picking in the person-to-goods picking mode; and for the goods-to-person picking order, the control system controls the goods picking in the goods-to-person picking mode.

3. The relay-type goods picking system of claim 1, wherein the manual picking area is provided with a plurality of manual picking inventory containers which stores the goods for manual picking, wherein each of the plurality of manual picking inventory containers has a unique number, and information on positions of the plurality of manual picking inventory containers and information on identifiers and quantities of goods at the positions are stored in the control system.

4. The relay-type goods picking system of claim 3, wherein when goods on inventory containers in the manual picking area are manually picked, information on positions of the manual picking inventory containers and information on identifiers and quantities of goods at the positions stored in the control system are updated.

5. The relay-type goods picking system of claim 1, wherein a picking frequency of the goods in the manual picking area is higher than a picking frequency of the goods in the robot picking inventory container area.

6. The relay-type goods picking system of claim 1, wherein the each auxiliary pickup tool for manual goods picking is bound with the container accommodated by the each auxiliary pickup tool for manual goods picking and the corresponding order information by scanning a barcode of the auxiliary pickup tool for manual goods picking and/or a barcode of the container with a scanner.

7. The relay-type goods picking system of claim 1, wherein in the person-to-goods picking mode, one of the auxiliary pickup tools for manual goods picking with an accommodated container is transported manually to the manual picking area for the goods picking; and in the goods-to-person picking mode, the picker and a container are at a picking position, one of the plurality of carrying robots carries one of the plurality of inventory containers to the operating position, and goods are picked from the one of the plurality of inventory containers to the container by the picker.

8. The relay-type goods picking system of claim 7, wherein in the person-to-goods picking mode, the picker transports or drives the one of the auxiliary pickup tools for manual goods picking, along a route planned by the control system, to the manual picking area for the goods picking.

9. The relay-type goods picking system of claim 8, wherein after the one of the auxiliary pickup tools for manual goods picking arrives at the manual picking area, the goods picking is performed manually in an order picking sequence instructed by the control system.

10. The relay-type goods picking system of claim 1, wherein under the control of the control system, the person-to-goods picking mode and the goods-to-person picking mode are used to complete the goods picking for the mixed order under the control of the control system by that:

in condition that the person-to-goods picking mode is performed before the goods-to-person picking mode, (1) after the goods picking in the person-to-goods picking mode is completed, one of the auxiliary pickup tools for manual goods picking which accommodates a container associated with the mixed order is transported to the operating position at which tool identifier information, container identifier information and corresponding order information of the one of the auxiliary pickup tools for manual goods picking and collecting are associated and maintained in the control system, and the corresponding order information has been updated to indicate a picking task to be completed in the mixed order, wherein the picking task only involves the goods in the robot picking inventory container area; (2) and then the goods picking is completed in the good-to-person picking mode, which comprises inventory container allocation, the inventory container carrying, and picking goods from inventory containers to a container on a seeding wall based on the order information; or in condition that the goods-to-person picking mode is performed before the person-to-goods picking mode, (1) at the operating position, the tool identifier information, the container identifier information and the corresponding order information of the one of the auxiliary pickup tools for manual goods picking and collecting are associated and maintained in the control system, and the corresponding order information indicates a picking task associated with the goods-to-person picking mode to be completed in the mixed order, wherein the picking task associated with the goods-to-person picking mode only involves the goods in the robot picking inventory container area; (2) and then the goods picking is completed in the good-to-person picking mode, which comprises the inventory container allocation, the inventory container carrying, and the picking goods from the inventory containers to the container on the seeding wall based on the order information; (3) after the goods picking in the goods-to-person picking mode is completed, the order information is updated to indicate a picking task associated with the person-to-goods picking mode to be completed in the mixed order, wherein the picking task associated with the person-to-goods picking mode merely involves the goods in the manual picking inventory container area.

11. A relay-type goods picking method executed by the relay-type goods picking system of claim 1, comprising:

for a mixed order which involves both goods in the manual picking area and goods in the robot picking inventory container area, completing, under control of the control system, goods picking for the mixed order by using a person-to-goods picking mode and a goods-to-person picking mode, wherein the person-to-goods picking mode is used to complete picking for the goods in the manual picking inventory container area and the goods-to-person picking mode is used to complete picking for the goods in the robot picking inventory container area;

wherein the completing the goods picking for the mixed order in the relay manner comprises:

first completing picking for the goods in the manual picking area in the person-to-goods picking mode and then completing picking for the goods in the robot picking inventory container area in the goods-to-person picking mode; or first completing picking for the goods in the robot picking rack area in the goods-to-person picking mode and then completing picking for the goods in the manual picking rack area in the person-to-goods picking mode;

wherein a seeding wall is placed at an operating position, wherein for a same mixed order, a same container is used for the goods picking in the person-to-goods picking mode and the goods picking in the goods-to-person picking mode, and the same container is placed on one of the auxiliary pickup tools for manual goods picking in the person-to-goods picking mode and is placed on the seeding wall in the goods-to-person picking mode; and after the same container is placed on the seeding wall, a position of the seeding wall rebound with a container identifier and order information.

12. The relay-type goods picking method of claim 11, further comprising:

classifying, by the control system, orders to be processed into a manual picking order, a goods-to-person picking order and the mixed order, wherein the manual picking order merely involves the goods in the manual picking area, the goods-to-person picking order merely involves the goods in the robot picking inventory container area, and the mixed order involves both the goods in the manual picking area and the goods in the robot picking inventory container area; wherein for the manual picking order, the goods picking is performed in the person-to-goods picking mode under the control of the control system;

for the goods-to-person picking order, under the control of the control system, the goods picking is performed in the goods-to-person picking mode that is based on robots, wherein in the goods-to-person picking order, the control system determines a inventory container to be carried based on the goods-to-person picking order, instructs one of the robots to carry the inventory container from the robot picking inventory container area to an operating position at which goods are picked from the inventory container by the picker under the control of the control system; and for the mixed order, under the control of the control system, completing the person-to-goods picking mode and the goods-to-person picking mode are used to complete the goods picking for the mixed order.

13. The relay-type goods picking method of claim 12, wherein when goods on manual picking racks in the manual picking rack area are manually picked, information on positions of the manual picking racks and information on identifiers and quantities of goods at the positions stored in the control system are updated.

14. The relay-type goods picking method of claim 12, wherein the each auxiliary pickup tool for manual goods picking is bound with the container accommodated by the each auxiliary pickup tool for manual goods picking and the corresponding order information by scanning a barcode of the auxiliary pickup tool for manual goods picking and/or a barcode of the container with a scanner.

15. The relay-type goods picking method of claim 12, wherein in the person-to-goods picking mode, one of the auxiliary pickup tools for manual goods picking with an accommodated container is transported manually to the manual picking area for the goods picking; and in the goods-to-person picking mode, the picker and a container are at a picking position, one of the plurality of carrying robots carries one of the plurality of inventory containers to the operating position, and goods are picked from the one of the plurality of inventory containers to the container by the picker.

16. The relay-type goods picking method of claim 15, wherein in the person-to-goods picking mode, the one of the auxiliary pickup tools for manual goods picking is transported manually along a route planned by the control system to the manual picking area for the goods picking.

17. The relay-type goods picking method of claim 16, wherein after the one of the auxiliary pickup tools for manual goods picking arrives at the manual picking area, the goods picking is performed manually in an order picking sequence instructed by the control system.

* * * * *